US006973543B1

(12) United States Patent
Hughes

(10) Patent No.: US 6,973,543 B1
(45) Date of Patent: Dec. 6, 2005

(54) PARTIAL DIRECTORY CACHE FOR REDUCING PROBE TRAFFIC IN MULTIPROCESSOR SYSTEMS

(75) Inventor: William Alexander Hughes, Burlingame, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 497 days.

(21) Appl. No.: 09/905,002

(22) Filed: Jul. 12, 2001

(51) Int. Cl.$^7$ ............................................. G06F 12/00
(52) U.S. Cl. ..................... 711/141; 711/119; 711/130; 711/144; 709/213; 709/214
(58) Field of Search ........................ 711/141, 144, 130, 711/119; 709/213, 214

(56) References Cited

U.S. PATENT DOCUMENTS

| | | | |
|---|---|---|---|
| 5,303,362 A * | 4/1994 | Butts et al. ................ | 711/121 |
| 5,864,671 A | 1/1999 | Hagersten et al. | |
| 5,873,117 A | 2/1999 | Hagersten et al. | |
| 6,202,126 B1 | 3/2001 | Van Doren et al. | |
| 6,275,905 B1 | 8/2001 | Keller et al. | |
| 6,393,529 B1 * | 5/2002 | Keller ......................... | 711/141 |
| 6,397,302 B1 | 5/2002 | Razdan et al. | |
| 6,430,639 B1 * | 8/2002 | Meyer et al. ............... | 710/200 |
| 6,446,189 B1 | 9/2002 | Zuraski, Jr. et al. | |
| 6,490,661 B1 * | 12/2002 | Keller et al. ............... | 711/150 |
| 6,633,960 B1 * | 10/2003 | Kessler et al. ............. | 711/144 |

OTHER PUBLICATIONS

U.S. Appl. No. 09/539,198, filed Mar. 29, 2000.
David E. Culler, "Composing Scalability and Node Design in CC-NUMA", Spring 2999, Computer Science Division, U.C. Berkeley, 6 pgs.
Veljko Milutinovic, "Caching in Distributed Systems", IEEE, 2000, 2 pgs.

* cited by examiner

*Primary Examiner*—Mano Padmanabhan
*Assistant Examiner*—Mehdi Namazi
(74) *Attorney, Agent, or Firm*—Erik A. Heter; Meyertons, Hood, Kivlin, Kowert & Goetzel, P.C.

(57) ABSTRACT

A partial directory cache records addresses of blocks which are known to be cached in a non-exclusive state in any caches currently caching the blocks. If a read command to a block recorded in the partial directory cache is received, one or more probes corresponding to the command may be inhibited. Since probes are selectively inhibited if an affected block is recorded in the partial directory cache, the size of the partial directory cache may be flexible. If a particular block is not represented in the partial directory cache, probes are performed when the particular block is accessed (even if the particular block could have been represented in the partial directory cache). Thus, coherency is maintained even if every non-exclusively cached block is not represented in the partial directory cache.

27 Claims, 12 Drawing Sheets

| Bit Time | 7 | 6 | 5 | 4 | 3 | 2 | 1 | 0 |
|---|---|---|---|---|---|---|---|---|
| 1 | | | CMD[5:0] | | | | | |
| 2 | | | | | | | | |
| 3 | | | | | | | | |
| 4 | | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | | | | | | | | |
| 5 | Addr[15:8] | | | | | | | |
| 6 | Addr[23:16] | | | | | | | |
| 7 | Addr[31:24] | | | | | | | |
| 8 | Addr[39:32] | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | SrcTag[4:0] | | | | |
| 4 | | | | | | | | |

| Bit Time | 7 | 6 | 5 | 4 | 3 | 2 | 1 | 0 |
|---|---|---|---|---|---|---|---|---|
| 1 | Data[7:0] | | | | | | | |
| 2 | Data[15:8] | | | | | | | |
| 3 | Data[23:16] | | | | | | | |
| 4 | Data[31:24] | | | | | | | |
| 5 | Data[39:32] | | | | | | | |
| 6 | Data[47:40] | | | | | | | |
| 7 | Data[55:48] | | | | | | | |
| 8 | Data[63:56] | | | | | | | |

| CMD Code | Command | Packet Type |
|---|---|---|
| 000000 | Nop | Info |
| 000001 | VicBlk | Command/Data |
| 000010 | Reserved | |
| 000011 | ValidateBlk | Command |
| 000100 | RdBlk | Command |
| 000101 | RdBlkS | Command |
| 000110 | RdBlkMod | Command |
| 000111 | ChangetoDirty | Command |
| x01xxx | WrSized | Command/Data |
| 01xxxx | ReadSized | Command |
| 100xxx | Reserved | |
| 110000 | RdResponse | Response/Data |
| 110001 | ProbeResp | Response |
| 110010 | TgtStart | Response |
| 110011 | TgtDone | Response |
| 110100 | SrcDone | Response |
| 110101 | MemCancel | Response |
| 11011x | Reserved | |
| 11100x | Probe | Command |
| 11101x | Broadcast | Command |
| 11110x | Reserved | |
| 111110 | Reserved | |
| 111111 | Sync | Info |

| V | Page Address | B0V | B1V | B2V | B3V | ... | B63V |
|---|---|---|---|---|---|---|---|

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | | | | | SrcTag[4:0] | | | |
| 4 | Sh | | | | | | | |

| Bit Time | 7 | 6 | 5 | 4 | 3 | 2 | 1 | 0 |
|---|---|---|---|---|---|---|---|---|
| 1 | SrcUnit[1:0] | | CMD[5:0] | | | | | |
| 2 | DestNode[2:0] | | | DestUnit[1:0] | | SrcNode[2:0] | | |
| 3 | Count[1:0] | | Err | SrcTag[4:0] | | | | |
| 4 | Sh | P | NP | | | Cncl | Count[3:2] | |

PARTIAL DIRECTORY CACHE FOR REDUCING PROBE TRAFFIC IN MULTIPROCESSOR SYSTEMS

BACKGROUND OF THE INVENTION

1. Field of the Invention

This invention is related to computer systems and, more particularly, to coherency mechanisms within computer systems.

2. Description of the Related Art

Typically, computer systems include one or more caches to reduce the latency of a processor's access to memory. Generally, a cache may store one or more blocks, each of which is a copy of data stored at a corresponding address in the memory system of the computer system.

Since a given block may be stored in one or more caches, and further since one of the cached copies may be modified with respect to the copy in the memory system, computer systems often maintain coherency between the caches and the memory system. Coherency is maintained if an update to a block is reflected by other cache copies of the block according to a predefined coherency protocol. Various coherency protocols are used. As used herein, a "block" is a set of bytes stored in contiguous memory locations which are treated as a unit for coherency purposes. In some embodiments, a block may also be the unit of allocation and deallocation in a cache. The number of bytes in a block may be varied according to design choice, and may be of any size. As an example, 32 byte and 64 byte blocks are often used.

Many coherency protocols include the use of probes to communicate between various caches within the computer system. Generally speaking, a "probe" is a message passed from the coherency point in the computer system to one or more caches in the computer system to determine if the caches have a copy of a block and optionally to indicate the state into which the cache should place the block. The coherency point may transmit the probes in response to a command from a component (e.g. a processor) to read or write the block. Each probe receiver responds to the probe, and once the probe responses are received the command may proceed to completion. The coherency point is the component responsible for maintaining coherency, e.g. a memory controller for the memory system.

Unfortunately, probes increase the bandwidth demands on the computer system and may increase the latency of the commands. Bandwidth demands are increased because the probes are transmitted through the interconnect of the computer system. Latency may increase because the probe responses are needed to verify that the data to be provided in response to the command is the correct copy of the block (i.e. that no cache stores an updated copy of the block). Accordingly, it is desirable to reduce the probe traffic in a computer system while still maintaining coherency.

SUMMARY OF THE INVENTION

A partial directory cache records addresses of blocks which are known to be cached in a non-exclusive state in any caches currently caching the blocks. If a read command to a block recorded in the partial directory cache is received, one or more probes corresponding to the command may be inhibited. System bandwidth which would be consumed by the probes may be conserved. Furthermore, since probes are inhibited, the latency of the command may be reduced since the command may be completed without waiting for any probe responses.

Since probes are selectively inhibited if an affected block is recorded in the partial directory cache, the size of the partial directory cache may be flexible. If a particular block is not represented in the partial directory cache, probes are performed when the particular block is accessed (even if the particular block could have been represented in the partial directory cache). Thus, coherency is maintained even if every non-exclusively cached block is not represented in the partial directory cache. Accordingly, the partial directory cache may be sized according to cost versus performance tradeoffs (and not according to concerns about correctly maintaining coherency).

Broadly speaking, an apparatus is contemplated, comprising a memory configured to store an indication of one or more addresses, wherein the memory is coupled to receive a first address of a read command, and a control circuit coupled to the memory. The control circuit is configured to cause an issuance of one or more probes corresponding to the read command responsive to the first address missing in the memory. Additionally, the control circuit is configured to inhibit the issuance of one or more probes corresponding to the read command responsive to the first address hitting in the memory.

Additionally, a computer system is contemplated, comprising a first node configured to transmit a read command having a first address and a second node coupled to receive the read command. The second node is coupled to a first memory storing a first block addressed by the first address. The second node also includes a second memory configured to store an indication of one or more addresses, wherein the second node is configured to issue one or more probes corresponding to the read command responsive to the first address missing in the memory. The second node is configured to inhibit the issuance of one or more probes corresponding to the read command responsive to the first address hitting in the memory.

Still further, a method is contemplated. A first address of a read command is received. A second memory configured to store an indication of one or more addresses is searched for the first address. If the searching results in a miss, one or more probes corresponding to the read command are transmitted. If the searching results in a hit, one or more probes are not transmitted.

BRIEF DESCRIPTION OF THE DRAWINGS

Other objects and advantages of the invention will become apparent upon reading the following detailed description and upon reference to the accompanying drawings in which:

FIG. 3 is a block diagram of one embodiment of an information packet.

FIG. 4 (Prior Art) is a block diagram of one embodiment of a command packet.

FIG. 5 is a block diagram of one embodiment of a response packet.

FIG. 6 (Prior Art) is a block diagram of one embodiment of a data packet.

FIG. 7 is a table illustrating one embodiment of packet definitions.

FIG. 14 is a block diagram of one embodiment of an entry in a partial directory cache shown in FIG. 9.

FIG. 15 is a block diagram of one embodiment of a SrcDone packet.

FIG. 16 is a block diagram of one embodiment of a RdResponse packet.

Figure 1:
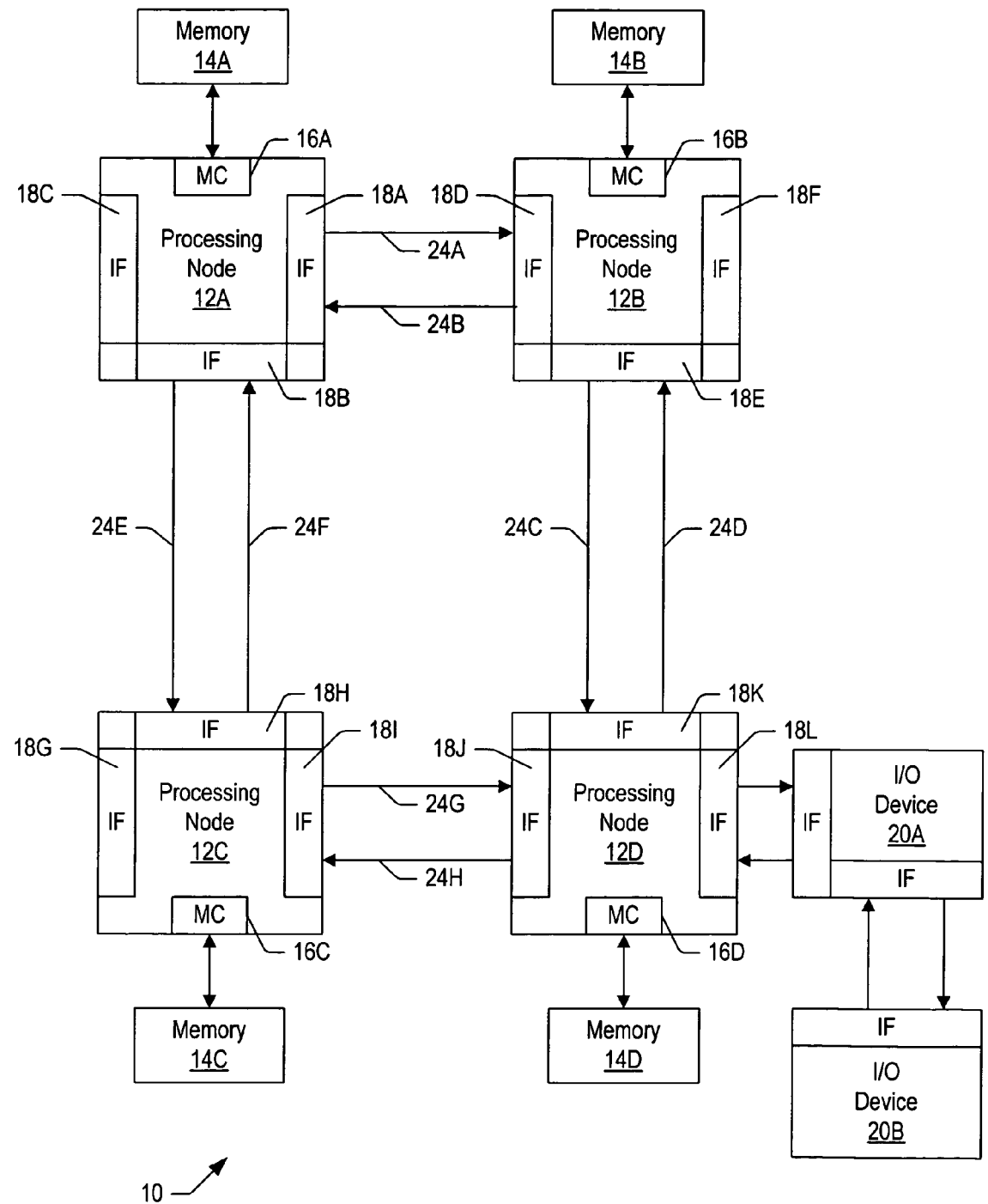
FIG. 1 is a block diagram of one embodiment of a computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

System Overview

Turning now to FIG. 1, one embodiment of a computer system 10 is shown. Other embodiments are possible and contemplated. In the embodiment of FIG. 1, computer system 10 includes several processing nodes 12A, 12B, 12C, and 12D. Each processing node is coupled to a respective memory 14A–14D via a memory controller 16A–16D included within each respective processing node 12A–12D. Additionally, processing nodes 12A–12D include interface logic used to communicate between the processing nodes 12A–12D. For example, processing node 12A includes interface logic 18A for communicating with processing node 12B, interface logic 18B for communicating with processing node 12C, and a third interface logic 18C for communicating with yet another processing node (not shown). Similarly, processing node 12B includes interface logic 18D, 18E, and 18F; processing node 12C includes interface logic 18G, 18H, and 18I; and processing node 12D includes interface logic 18J, 18K, and 18L. Processing node 12D is coupled to communicate with an input/output (I/O) device 20A via interface logic 18L, and I/O device 20A is further coupled to a second I/O device 20B. Other processing nodes may communicate with other I/O devices in a similar fashion. Alternatively, a processing node may communicate with an I/O bridge which is coupled to an I/O bus.

Processing nodes 12A–12D implement a packet-based link for inter-processing node communication. In the present embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C–24H are used to transmit packets between other processing nodes as illustrated in FIG. 1. The link may be operated in a cache coherent fashion for communication between processing nodes or in a noncoherent fashion as a daisy-chain structure between I/O devices 20A–20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C as shown in FIG. 1. Any suitable routing algorithm may be used. Other embodiments of computer system 10 may include more or fewer processing nodes then the embodiment shown in FIG. 1.

Processing nodes 12A–12D, in addition to a memory controller and interface logic, may include one or more processors. Broadly speaking, a processing node comprises at least one processor and may optionally include a memory controller for communicating with a memory and other logic as desired. As used herein, a "node" is a device which is capable of participating in transactions upon the interconnect.

Memories 14A–14D may comprise any suitable memory devices. For example, a memory 14A–14D may comprise one or more RAMBUS DRAMs (RDRAMs), synchronous DRAMs (SDRAMs), DRAM, static RAM, etc. The address space of computer system 10 is divided among memories 14A–14D. Each processing node 12A–12D may include a memory map used to determine which addresses are mapped to which memories 14A–14D, and hence to which processing node 12A–12D a memory request for a particular address should be routed. In one embodiment, the coherency point for an address within computer system 10 is the memory controller 16A–16D coupled to the memory storing bytes corresponding to the address. Memory controllers 16A–16D may comprise control circuitry for interfacing to memories 14A–14D. Additionally, memory controllers 16A–16D may include request queues for queuing memory requests.

Generally, interface logic 18A–18L may comprise buffers for receiving packets from the link and for buffering packets to be transmitted upon the link. Computer system 10 may employ any suitable flow control mechanism for transmitting packets. For example, in one embodiment, each node stores a count of the number of each type of buffer within the receiver at the other end of the link to which each interface logic is connected. The node does not transmit a packet unless the receiving node has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 20A–20B are illustrative of any desired peripheral devices. For example, I/O devices 20A–20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Figure 2:
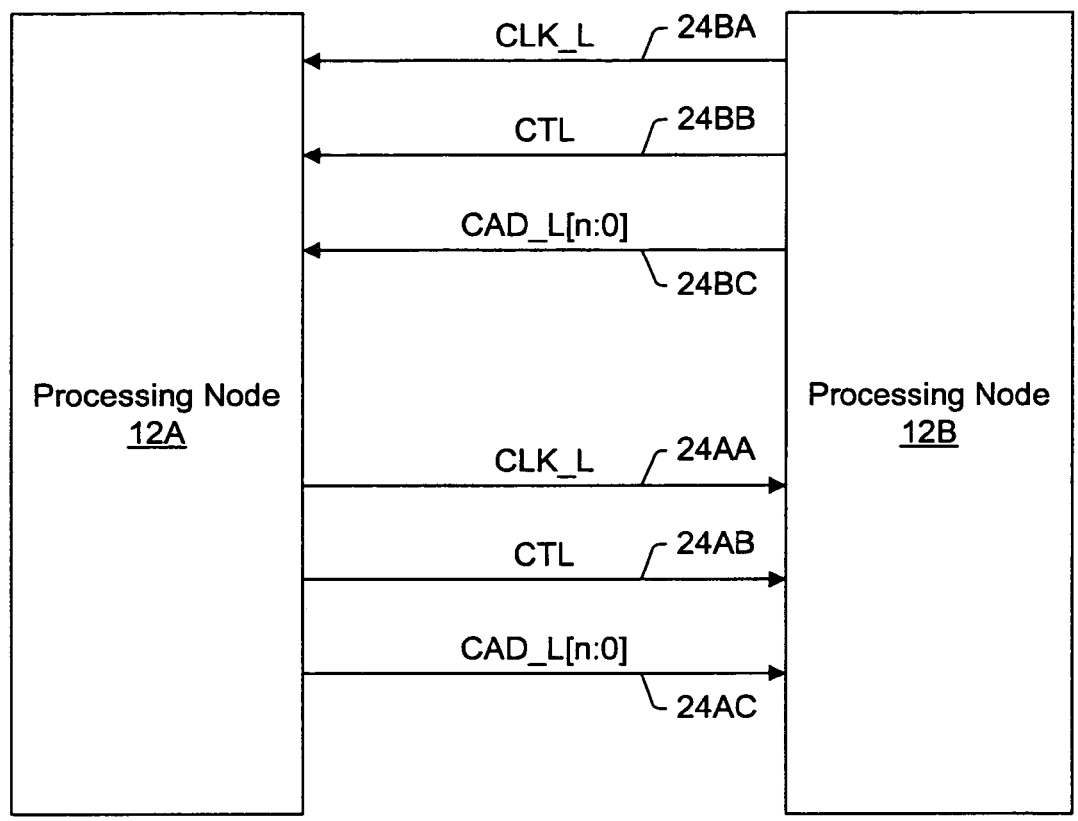
FIG. 2 (Prior Art) is a block diagram of one embodiment of a pair of nodes shown in FIG. 1, highlighting one embodiment of interconnection therebetween.

Turning next to FIG. 2, a block diagram illustrating processing nodes 12A and 12B is shown to illustrate one embodiment of the links therebetween in more detail. Other embodiments are possible and contemplated. In the embodiment of FIG. 2, lines 24A include a clock line 24AA, a control line 24AB, and a control/address/data bus 24AC. Similarly, lines 24B include a clock line 24BA, a control line 24BB, and a control/address/data bus 24BC.

The clock line transmits a clock signal which indicates a sample point for the control line and the control/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the control/address/data bus. For example, two clock lines may be used for a 32 bit control/address/data bus (with one half of the control/address/data bus referenced to one of the clock lines and the other half of the control/address/data bus and the control line referenced to the other one of the clock lines.

The control line indicates whether or not the data transmitted upon the control/address/data bus is either a bit time of a control packet or a bit time of a data packet. The control line is asserted to indicate a bit time of a control packet, and deasserted to indicate a bit time of a data packet. Certain control packets indicate that a data packet follows. The data packet may immediately follow the corresponding control packet. In one embodiment, other control packets may interrupt the transmission of a data packet. Such an interruption may be performed by asserting the control line for a number of bit times during transmission of the data packet and transmitting the bit times of the control packet while the control line is asserted. Control packets which interrupt a data packet may not indicate that a data packet will be following. Additionally, in one embodiment, the control line may be deasserted during transmission of a control packet to indicate stall bit times. A subsequent reassertion of the control line may indicate that the control packet is continuing.

The control/address/data bus comprises a set of lines for transmitting the data/control bits. In one embodiment, the control/address/data bus may comprise 8, 16, or 32 lines. Each processing node or I/O bridge may employ any one of the supported numbers of lines according to design choice. Other embodiments may support other sizes of control/address/data bus as desired.

According to one embodiment, the command/address/data bus lines and the clock line may carry inverted data (i.e. a logical one is represented as a low voltage on the line, and a logical zero is represented as a high voltage). Alternatively, lines may carry non-inverted data (in which a logical one is represented as a high voltage on the line, and logical zero is represented as a low voltage).

Turning now to FIGS. 3–6, exemplary packets employed in one embodiment of system 10 are shown. FIGS. 3–5 illustrate control packets and FIG. 6 illustrates a data packet. Other embodiments may employ different packet definitions, as desired. Each of the packets are illustrated as a series of bit times enumerated under the "bit time" heading. The bit times of the packet are transmitted according to the bit time order listed. FIGS. 3–6 illustrate packets for an eight bit control/address/data bus implementation. Accordingly, each bit time comprises eight bits numbered seven through zero. Bits for which no value is provided in the figures may either be reserved for a given packet, or may be used to transmit packet-specific information. Fields indicated by dotted lines indicate optional fields which may not be included in all of the packets of a certain type.

Generally speaking, a packet is a communication between two nodes (an initiating node which transmits the packet and a destination node which receives the packet). The initiating node and the destination node may differ from the source and target node of the transaction of which the packet is a part, or either node may be either the source node or the target node. A control packet is a packet carrying control information regarding the transaction. Certain control packets specify that a data packet follows. The data packet carries data corresponding to the transaction and corresponding to the specifying control packet.

FIG. 3 illustrates an information packet (info packet) 30. Info packet 30 comprises four bit times on an eight bit link. The command encoding is transmitted during bit time one, and comprises six bits in the present embodiment. Each of the other control packets shown in FIGS. 4 and 5 include the command encoding in the same bit positions during bit time 1. Info packet 30 may be used to transmit messages between processing nodes when the messages do not include a memory address. Additionally, info packets may be used to transmit buffer free counts using the coupon-based flow control scheme.

FIG. 4 illustrates a command packet 32. Command packet 32 comprises eight bit times on an eight bit link. The command encoding is transmitted during bit time 1. A source unit number is transmitted during bit time 1 as well, and a source node number is transmitted during bit time two. A node number unambiguously identifies one of the processing nodes 12A–12D within computer system 10, and is used to route the packet through computer system 10. The unit number identifies a unit within the node which sourced the transaction (source unit number) or which is the destination of the transaction (destination unit number). Units may include memory controllers, caches, processors, etc. Optionally, command packet 32 may include either a destination node number and destination unit in bit time 2 (or a target node number and target unit, for some other packets). If the destination node number is included, it is used to route the packet to the destination node. Also, many command packets may include a source tag in bit time 3 which, together with the source node and source unit, may link the packet to a particular transaction of which it is a part. Bit times five through eight are used to transmit the most significant bits of the memory address affected by the transaction. Command packet 32 may be used to initiate a transaction (e.g. a read or write transaction), as well as to transmit commands in the process of carrying out the transaction for those commands which carry the memory address affected by the transaction. Generally, a command packet indicates an operation to be performed by the destination node.

Some of the undefined fields in packet 32 may be used in various command packets to carry packet-specific information. Furthermore, bit time 4 may be used in some commands to transmit the least significant bits of the memory address affected by the transaction.

FIG. 5 illustrates a response packet 34. Response packet 34 includes the command encoding and a destination node number and destination unit number. The destination node number identifies the destination node for the response packet (which may, in some cases, be the source node or target node of the transaction). The destination unit number identifies the destination unit within the destination node. Various types of response packets may include additional information. For example, a read response packet may indicate the amount of read data provided in a following data packet. Probe responses may indicate whether or not a copy of the requested block is being retained by the probed node. Generally, response packet 34 is used for commands during the carrying out of a transaction which do not require transmission of the memory address affected by the transaction. Furthermore, response packet 34 may be used to transmit positive acknowledgement packets to terminate a transaction. Similar to the command packet 32, response packet 34 may include the source node number, the source unit number, and the source tag for many types of responses (illustrated as optional fields in FIG. 5).

FIG. 6 illustrates the data packet 36. Data packet 36 includes eight bit times on an eight bit link in the embodiment of FIG. 6. Data packet 36 may comprise different numbers of bit times dependent upon the amount of data being transferred. For example, in one embodiment a block comprises 64 bytes and hence 64 bit times on an eight bit link. Other embodiments may define a block to be of a different size, as desired. Additionally, data may be transmitted in less than block sizes for non-cacheable reads and writes. Data packets for transmitting data less than block size employ fewer bit times. In one embodiment, non-block sized data packets may transmit several bit times of byte enables prior to transmitting the data to indicate which data bytes are valid within the data packet. Furthermore, block data may be returned with the quadword addressed by the least significant bit of the request address first, followed by interleaved return of the remaining quadwords. A quadword may comprise 8 bytes, in one embodiment.

FIGS. 3–6 illustrate packets for an eight bit link. Packets for 16 and 32 bit links may be formed by concatenating consecutive bit times illustrated in FIGS. 3–6. For example, bit time one of a packet on a 16 bit link may comprise the information transmitted during bit times one and two on the eight bit link. Similarly, bit time one of the packet on a 32 bit link may comprise the information transmitted during bit times one through four on the eight bit link. Formulas 1 and 2 below illustrate the formation of bit time one of a 16 bit link and bit time one of a 32 bit link according to bit times from an eight bit link.

$$BT1_{16}[15:0]=BT2_8[7:0]\|BT1_8[7:0] \quad (1)$$

$$BT1_{32}[31:0]=BT4_8[7:0]\|BT3_8[7:0]\|BT2_8[7:0]\|BT1_8[7:0] \quad (2)$$

Turning now to FIG. 7, a table 38 is shown illustrating packets employed according to one exemplary embodiment of the coherent link within computer system 10. Other embodiments are possible and contemplated, including any other suitable set of packets and command field encodings. Table 38 includes a command code column illustrating the command encodings assigned to each command, a command column naming the command, and a packet type column indicating which of command packets 30–34 (and data packet 36, where specified) is employed for that command.

A read transaction is initiated using one of the ReadSized, RdBlk, RdBlkS or RdBlkMod commands. The ReadSized command is used for non-cacheable reads or reads of data other than a block in size. The amount of data to be read is encoded into the ReadSized command packet. For reads of a block, the RdBlk command may be used unless: (i) a writeable copy of the block is desired, in which case the RdBlkMod command may be used; or (ii) a copy of the block is desired but no intention to modify the block is known, in which case the RdBlkS command may be used. The RdBlkS command may be used to make certain types of coherency schemes (e.g. directory-based coherency schemes) more efficient. In general, the appropriate read command is transmitted from the source initiating the transaction to a target node which owns the memory corresponding to the block. The target node transmits Probe commands (indicating return of probe responses to the source of the transactions) to the other nodes in the system to maintain coherency by changing the state of the block in those nodes and by causing a node including an updated copy of the block to send the block to the source node. Each node receiving a Probe command transmits a ProbeResp response packet to the source node. If a probed node has an updated copy of the read data (i.e. dirty data), that node transmits a RdResponse response packet and the dirty data. A node transmitting dirty data may also transmit a MemCancel response packet to the target node in an attempt to cancel transmission by the target node of the requested read data. Additionally, the memory controller in the target node transmits the requested read data using a RdResponse response packet followed by the data in a data packet. If the source node receives a RdResponse response packet from a probed node, that read data is used. Otherwise, the data from the target node is used. Once each of the probe responses and the read data is received in the source node, the source node transmits a SrcDone response packet to the target node as a positive acknowledgement of the termination of the transaction.

A write transaction is initiated using a WrSized or VicBlk command followed by a corresponding data packet. The WrSized command is used for non-cacheable writes or writes of data other than a block in size. To maintain coherency for WrSized commands, the target node transmits Probe commands (indicating return of probe response to the target node of the transaction) to each of the other nodes in the system. In response to Probe commands, each probed node transmits a ProbeResp response packet to the target node. If a probed node is storing dirty data, the probed node responds with a RdResponse response packet and the dirty data. In this manner, a block updated by the WrSized command is returned to the memory controller for merging with the data provided by the WrSized command. The memory controller, upon receiving probe responses from each of the probed nodes, transmits a TgtDone response packet to the source node to provide a positive acknowledgement of the termination of the transaction. The source node replies with a SrcDone response packet.

A victim block which has been modified by a node and is being replaced in a cache within the node is transmitted back to memory using the VicBlk command. Probes are not needed for the VicBlk command. Accordingly, when the target memory controller is prepared to commit victim block data to memory, the target memory controller transmits a TgtDone response packet to the source node of the victim block. The source node replies with either a SrcDone response packet to indicate that the data should be committed or a MemCancel response packet to indicate that the data has been invalidated between transmission of the VicBlk command and receipt of the TgtDone response packet (e.g. in response to an intervening probe).

The ChangetoDirty command packet may be transmitted by a source node in order to obtain write permission for a block stored by the source node in a non-writeable state. A transaction initiated with a ChangetoDirty command may operate similar to a read except that the target node does not return data. The ValidateBlk command may be used to obtain write permission to a block not stored by a source node if the source node intends to update the entire block.

No data is transferred to the source node for such a transaction, but otherwise operates similar to a read transaction.

The TgtStart response may be used by a target to indicate that a transaction has been started (e.g. for ordering of subsequent transactions). The Nop info packet is a no-operation packet which may be used, e.g. to transfer buffer free indications between nodes. The Broadcast command may be used to broadcast messages between nodes (e.g., the broadcast command may be used to distribute interrupts). Finally, the sync info packet may be used for cases in which synchronization of the fabric is desired (e.g. error detection, reset, initialization, etc.).

Processing Node

Figure 8:
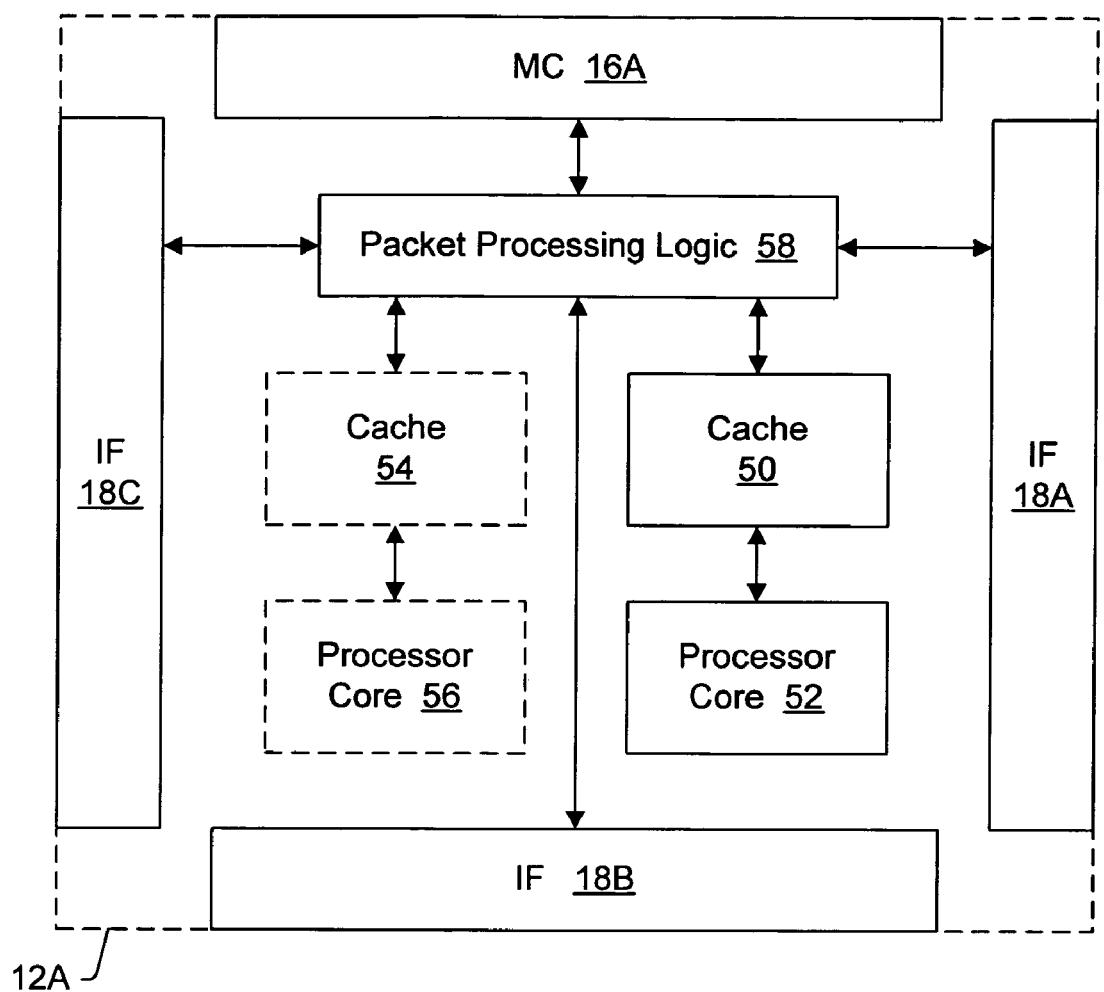
FIG. 8 is a block diagram of one embodiment of a processing node.

Turning now to FIG. 8, a block diagram of one embodiment of an exemplary processing node 12A is shown. Other processing nodes 12B–12D may be configured similarly. Other embodiments are possible and contemplated. In the embodiment of FIG. 8, processing node 12A includes interface logic 18A, 18B, and 18C and memory controller 16A. Additionally, processing node 12A includes a processor core 52 and a cache 50, packet processing logic 58, and may optionally include a second processor core 56 and a second cache 54. Interface logic 18A–18C are coupled to packet processing logic 58. Processor cores 52 and 56 are coupled to caches 50 and 54, respectively. Caches 50 and 54 are coupled to packet processing logic 58. Packet processing logic 58 is coupled to memory controller 16A.

Generally, packet processing logic 58 is configured to respond to control packets received on the links to which processing node 12A is coupled, to generate control packets in response to caches 50 and 54 and/or processor cores 52 and 56, to generate probe commands and response packets in response to transactions selected by memory controller 16A for service, and to route packets for which node 12A is an intermediate node to another of interface logic 18A–18C for transmission to another node. Interface logic 18A, 18B, and 18C may include logic to receive packets and synchronize the packets to the internal clock used by packet processing logic 58.

Caches 50 and 54 comprise high speed cache memories configured to store blocks of data. Caches 50 and 54 may be integrated within respective processor cores 52 and 56. Alternatively, caches 50 and 54 may be coupled to processor cores 52 and 56 in a backside cache configuration or an in-line configuration, as desired. Still further, caches 50 and 54 may be implemented as a hierarchy of caches. Caches which are nearer processor cores 52 and 56 (within the hierarchy) may be integrated into processor cores 52 and 56, if desired.

Processor cores 52 and 56 include the circuitry for executing instructions according to a predefined instruction set. For example, the x86 instruction set architecture may be selected. Alternatively, the Alpha, PowerPC, or any other instruction set architecture may be selected. Generally, the processor cores access the caches for data and instructions. If a cache miss is detected, a read request is generated and transmitted to the memory controller within the node to which the missing block is mapped.

Memory Controller

Figure 9:
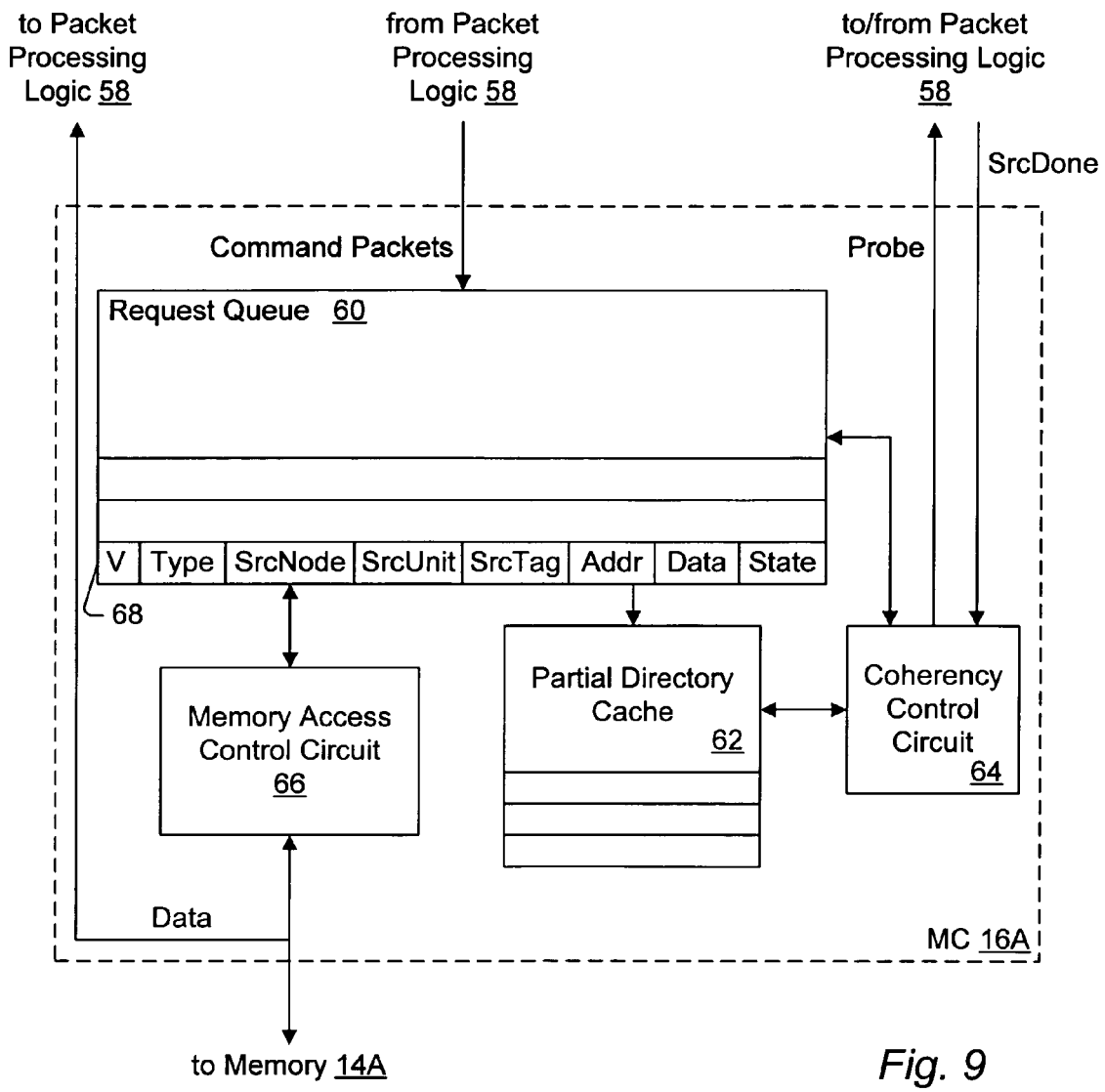
FIG. 9 is a block diagram of one embodiment of a memory controller including a partial directory cache and a coherency control circuit.

Turning next to FIG. 9, a block diagram of one embodiment of memory controller 16A is shown. Other memory controllers 16B–16D may be configured similarly. Other embodiments are possible and contemplated. In the embodiment of FIG. 9, memory controller 16A includes a request queue 60, a partial directory cache 62, a coherency control circuit 64, and a memory access control circuit 66. Request queue 60 is coupled to receive command packets from packet processing logic 58 and is further coupled to coherency control circuit 64, partial directory cache 62, and memory access control circuit 66. Coherency control circuit 64 is coupled to partial directory cache 62 and is further coupled to packet processing logic 58. Memory access control circuit 66 is further coupled to memory 14A and to packet processing logic 58.

Memory controller 16A receives command packets from packet processing logic 58 into request queue 60. The command packets are routed to memory controller 16A by packet processing logic 58 if the address affected by the command corresponds to a memory location in memory 14A. In other words, if the address of the command packet addresses a block stored in memory 14A, the command packet is routed to memory controller 16A. Memory controller 16A queues the command information in request queue 60, and subsequently processes the command. More particularly, coherency control circuit 64 ensures that the command is performed in a coherent fashion. If probes are required for the command, coherency control circuit 64 transmits a probe indication to packet processing logic 58. For example, the probe indication may include the SrcNode, SrcUnit, and SrcTag from the corresponding command, the address, and the type of command. Packet processing logic 58 may transmit Probe commands in response to the probe indication. Coherency control circuit 64 receives SrcDone packets from packet processing logic 58, and may further receive probe responses for WrSized commands (not shown in FIG. 9). Memory access control circuit 66 may interface with memory 14A to perform commands which are committed by coherency control circuit 64 (e.g. after coherency operations have been transmitted and any responses to be received from other nodes have been received). If the command is a read, data may be returned from memory 14A to packet processing logic 58 for forwarding to the source node in a RdResponse packet.

Coherency control circuit 64 may determine if probes are required for a command from the type of command. Additionally, coherency control circuit 64 may inhibit transmission of probes for a first command which may typically require probes (by not transmitting the probe indication to packet processing logic 58 for the first command) if the block affected by the first command is represented in partial directory cache 62. More particularly, partial directory cache 62 may comprise a memory configured to store an indication of one or more addresses. Each address may identify a block which is known to be non-exclusively cached in any caches which may be storing the block. Since the block is non-exclusively cached, a device which is going to modify the block first communicates with memory controller 16A to ensure coherency. Since the block is non-exclusively cached (e.g. shared or invalid in the MESI coherency protocol) any place that it is cached, probes are not needed to ensure coherency for read commands which do not attempt to gain exclusive access to the block. Instead, the block may be provided in a shared state to the source node of the read command and a proper coherency state may exist in the system (e.g. each cache currently storing the block may have it in the shared state, in the MESI protocol). When processing a non-exclusive read command (e.g. ReadSized, RdBlk, and RdBlks in the embodiment of FIGS. 1–8), the read address of the read command is presented to partial directory cache 62 to determine if the read address hits in partial directory cache 62. If the address hits, then coherency control circuit 64 inhibits probes corresponding to the non-exclusive read command by not transmitting the probe indication to packet processing logic 58.

Addresses may be stored into the partial directory cache in response to non-exclusive read commands which miss the partial directory cache and for which the corresponding probes (issued due to the miss) result in clean probe responses from the probed nodes. In the embodiment of FIGS. 1–8, the probe responses are collected by the source node and a SrcDone packet is transmitted by the source node in response to receiving the responses and at least one RdResponse packet with the data. The source node may indicate in the SrcDone packet that clean probe responses were received, and if the indication is included in the SrcDone packet corresponding to a read command, coherency control unit 64 may store the address in the partial directory cache. Finally, addresses may be deleted from the partial directory cache if overwritten by a more recent address (according to any desired replacement scheme) or if another command which gains exclusive access to the corresponding block or which modifies the corresponding block is processed by memory controller 16A. In the embodiment of FIGS. 1–8, commands which gain exclusive access to a block or which update the block may include WrSized, ValidateBlk, RdBlkMod, and ChangetoDirty. VicBlk is also a write command, but is typically used to write back a block which was modified while cached. Since partial directory cache 62 stores addresses which are non-exclusively cached, a VicBlk may not be expected to invalidate an address in partial directory cache 62.

Using the partial directory cache to inhibit probe issuance for read commands may reduce the probe traffic in the system, thereby alleviating the bandwidth requirements for probes. Furthermore, latency may be reduced for those commands for which probes are not sent, since the source of those commands may complete the commands without waiting for probe responses. The partial directory cache may leverage the use of data which is frequently shared but infrequently updated. For example, instruction code may be frequently shared but infrequently updated.

Additionally, using partial directory cache 62 to selectively inhibit the use of probes when a hit therein is detected may allow for flexibility in the size of the partial directory cache. If a particular block is not represented in partial directory cache 62 (i.e. the address misses in partial directory cache 62), probes are performed when the block is accessed (even if the particular block could have been represented in partial directory cache 62 but is not because of a limited capacity). Thus, coherency is maintained even if every non-exclusively cached block is not represented in partial directory cache 62. Accordingly, partial directory cache 62 may be sized according to cost versus performance tradeoffs (and not according to concerns about correctly maintaining coherency).

Partial directory cache 62 may comprise any suitable structure. For example, partial directory cache 62 may be a fully associative memory in which any entry may be used for any block address. The cache may be operated as a FIFO in which the oldest entry is deleted when a new entry is added. Alternatively, the cache may be operated as a modified FIFO in which invalid entries are filled before discarding the oldest valid entry. In another alternative, the cache may use least recently used (LRU) replacement to replace entries. Other embodiments may use any other replacement algorithm. Partial directory cache 62 may also be a set associative or direct mapped cache in which the block address is used as an index to select an eligible entry or entries corresponding to the block address.

A hit may be detected in partial directory cache 62 in a variety of ways. For example, partial directory cache 62 may comprise a content addressable memory (CAM) in which the comparing portion stores the address. Alternatively, one or more addresses may be read from partial directory cache 62 and provided to comparator circuits (e.g. within coherency control circuit 64) for comparison to detect a hit.

An exemplary request queue entry 68 is illustrated in FIG. 9 as well. Other embodiments may store additional, less, or alternative information to the information illustrated in FIG. 9. A request queue entry may be allocated to each command received by memory controller 16A. As illustrated in FIG. 9, a request queue entry includes a valid bit (V), a type field (Type) indicating which type of command is received (e.g. command encodings from bit time 1 of the packet may be stored), a SrcNode field storing the source node number identifying the source node of the command, a SrcUnit field storing the source unit number identifying the source unit within the source node, a SrcTag field storing the source tag assigned by the source node, an address field (Addr) storing the address affected by the command, a data field (Data) for storing the data corresponding to the command (for writes and victim blocks), and a state field (State) storing a state of the request. The state field may be used by coherency control circuit 64 and memory access control circuit 66 to track the progress of a command from reception by request queue 60 through various coherency actions initiated by coherency control circuit 64 and performance of the memory operation by memory access control circuit 66.

As mentioned above, coherency control circuit 64 may provide a probe indication to packet processing logic 58 in cases in which probes are required by the command and the block accessed by the command is not recorded in partial directory cache 62. In the present embodiment, packet processing logic 58 broadcasts Probe commands to each node in computer system 10. However, other systems may be configured differently. Accordingly, one or more probe commands may be transmitted dependent upon the computer system configuration.

The embodiment of memory controller 16A illustrated in FIG. 9 is one embodiment which may be used in the system illustrated in FIGS. 1–8 above or in other similar system configurations. However, the above computer system embodiment is exemplary only, and memory controller 16A as illustrated in FIG. 9 may be used in other system embodiments as well. For example, while the system embodiment illustrated is a distributed memory system, memory controller 16A and particularly partial directory cache 62 may be used in a shared memory system in which memory 14A is the complete system memory. Furthermore, memory controller 16A and particularly partial directory cache 62 may be used in embodiments in which a shared bus is used to couple processors to the memory system (possibly through a memory hierarchy). Furthermore, buses such as those used to couple to one or more AMD Athlon™ processors (in which the address bus is point to point from each processor to a bus bridge) may be used. In such systems, bus transactions or signals may be used to transmit commands, probes, etc, instead of packets (or packets may be used in such systems). Accordingly, while command, probe, and response packets (e.g. SrcDone, TgtDone, and RdResponse) are described as being used in the exemplary embodiment, generally a "message" may be transmitted between components to transmit a command, probe, or response. A "message" may be any form of communication between two components. For example, a message may be a packet (as illustrated in the exemplary embodiment herein), a bus transaction, a dedicated signal or signals between the components, etc. Generally, the partial directory cache may be implemented at the point of coherency in any given computer system (or points of coherency, in a distributed memory system).

As used herein, the term "hit", when referring to the partial directory cache, refers to an input block address matching with one of the block addresses for which an indication is stored in the partial directory cache. The indication may be the block address itself, in some embodiments. In another embodiment in which page addresses and valid bits are stored (e.g. the embodiment of FIG. 14), the indication maybe the page address corresponding to the block address and the corresponding valid bit being set. Any indication which identifies a given block address may be used. The term "miss", when referring to the partial directory cache, refers to an input block address not matching with any of the block addresses for which an indication is stored in the partial directory cache. Additionally, a "clean probe response" is a response indicating that the transmitter of the response is not caching the block corresponding to the probe in a modified state or a state that allows the transmitter to modify the block without communicating with the point of coherency. For example, in the MESI or MOESI protocols, the cache states that comprise a clean probe response may be invalid and shared. In other words, the cache states that are modified or allow the transmitter to modify the block without communicating with the point of coherency may include the modified and exclusive states of the MESI protocol or the modified, exclusive, and owned state in the MOESI protocol. A device having "exclusive access" to a block means that the device is the only device other than the memory which has access to the block. A device having exclusive access may be allowed to modify the block without communicating with the point of coherency.

Figure 10:
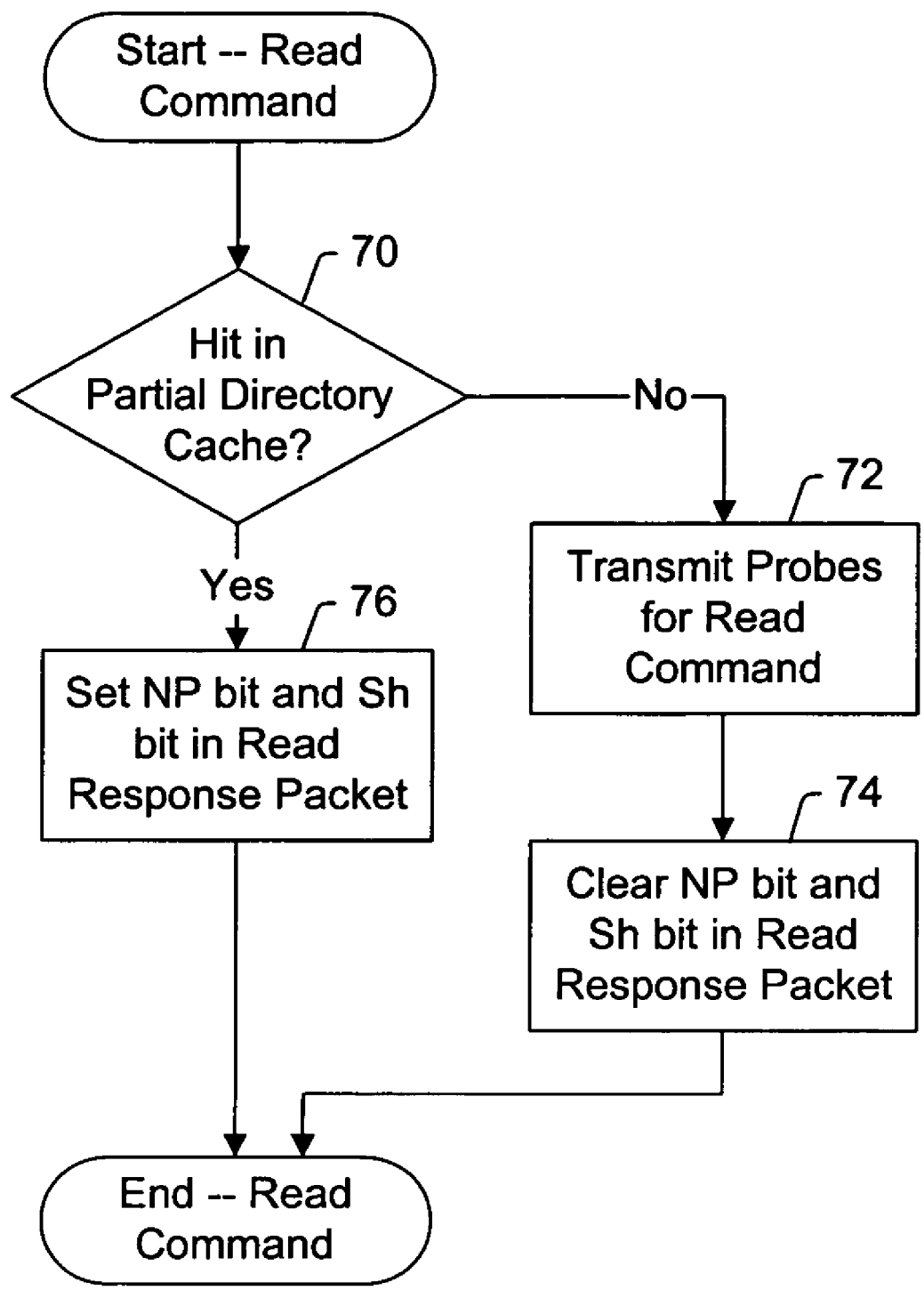
FIG. 10 is a flowchart illustrating operation of one embodiment of the coherency control circuit shown in FIG. 9 for read commands.

Turning now to FIG. 10, a flowchart is shown illustrating operation of one embodiment of coherency control circuit 64 in response to a read command being selected from request queue 60 for processing. Other embodiments are possible and contemplated. The blocks shown in FIG. 10 are illustrated in a particular order for ease of understanding. However, any order may be used. Furthermore, blocks may be performed in parallel by combinatorial logic within the coherency control circuit 64. Still further, blocks may be performed at different times from other blocks (e.g. different clock cycles).

If the read address of the read command is a miss in partial directory cache 62 (decision block 70, "no" leg), coherency control circuit 64 may cause the transmission of probes for the read command (block 72). Additionally, coherency control circuit 54 may cause the NP bit and the Sh bit to be cleared in the RdResponse packet transmitted by memory controller 16A to the source of the read command (block 74). An exemplary RdResponse packet having the NP bit and the Sh bit is illustrated below in FIG. 16. Coherency control circuit 64 may communicate with the memory access control circuit 66 to cause the NP bit and the Sh bit to be cleared, or may transmit indications to packet processing logic 58 to cause the bits to be cleared when the RdResponse packet is generated for transmission. Generally, the NP bit is used to indicate whether or not probes were transmitted for the read command (and thus whether or not the source node is to expect probe responses for the read command). The Sh bit indicates whether or not the source node is to cache the block in the shared state. Any indications may be used in other embodiments (including side band signals in bus based embodiments, etc.).

On the other hand, if the read address is a hit in the partial directory cache 62 (decision block 70, "yes" leg), coherency control circuit 64 does not cause probes to be transmitted. Coherency control circuit 64 may cause the NP bit and the Sh bit to be set in the RdResponse packet transmitted to the source node (block 76). Thus, the source node may not expect probe responses (and may not wait for those probe responses before completing the read command) and may cache the block in the shared state.

It is noted that the flowchart of FIG. 10 may be applicable to non-exclusive read commands. Read commands which require exclusive access (e.g. RdBlkMod in the embodiment of FIGS. 1–8) may be treated like write commands.

Figure 11:
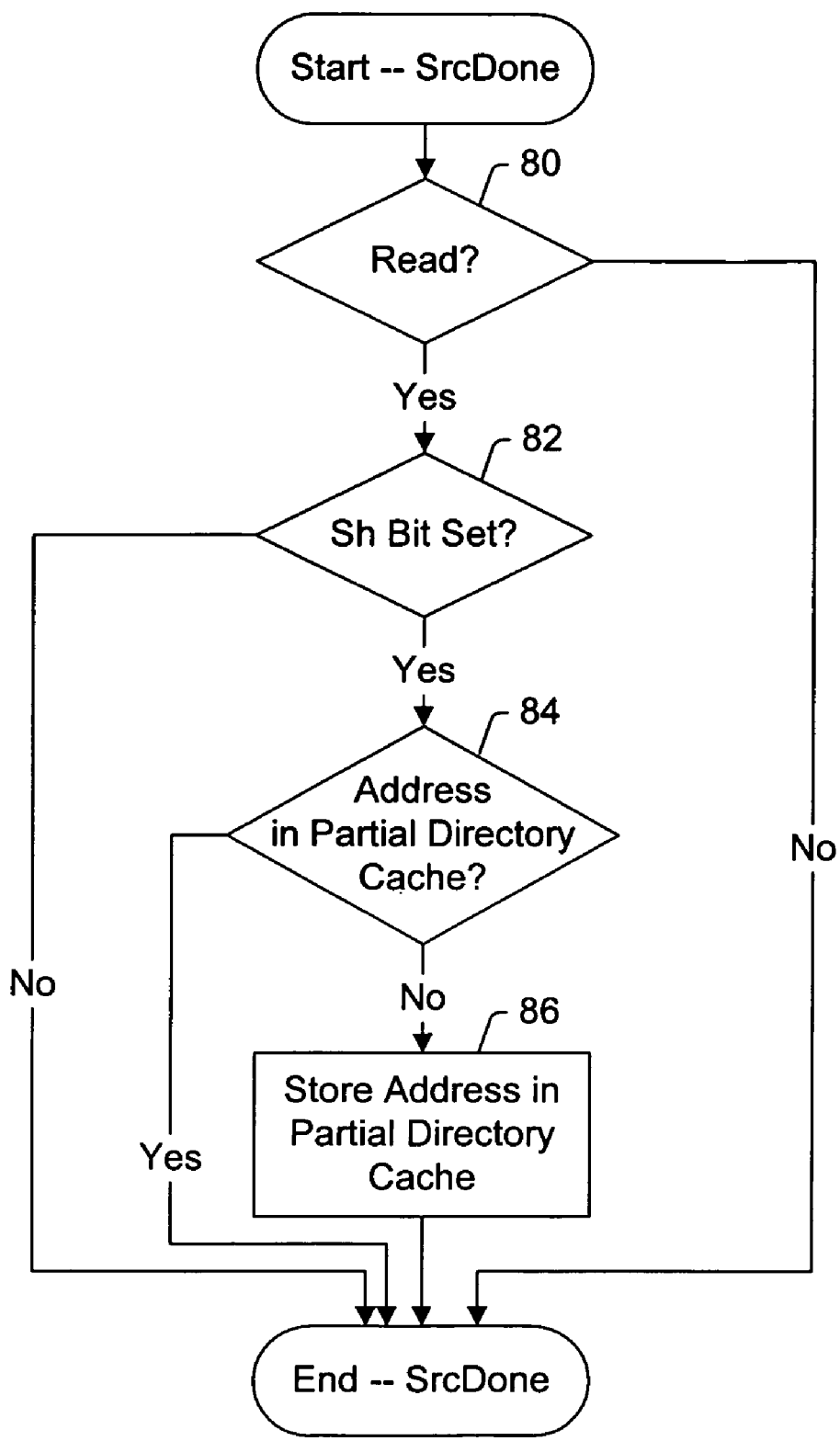
FIG. 11 is a flowchart illustrating operation of one embodiment of the coherency control circuit shown in FIG. 9 in response to a source done packet.

Turning now to FIG. 11, a flowchart is shown illustrating operation of one embodiment of coherency control circuit 64 in response to a SrcDone packet. Other embodiments are possible and contemplated. The blocks shown in FIG. 11 are illustrated in a particular order for ease of understanding. However, any order may be used. Furthermore, blocks may be performed in parallel by combinatorial logic within the coherency control circuit 64. Still further, blocks may be performed at different times from other blocks (e.g. different clock cycles).

If the SrcDone packet is not the SrcDone for a read command (decision block 80, "no" leg), then coherency control circuit 64 may take no action with regard to the SrcDone packet. In embodiments in which the memory controller locks a block during each transaction to that block (such that other transactions to the block are not initiated), the lock may be released in response to the SrcDone packet.

If the SrcDone packet is for a read command (decision block 80, "yes" leg) and the Sh bit in the SrcDone packet is clear (decision block 82, "no" leg), coherency control circuit 64 may again take no action with regard to the SrcDone packet. The Sh bit in the SrcDone packet is used to indicate whether or not clean probe responses were received with respect to the read command and that the source node is caching the block in a shared state. If one or more probe responses were not clean probe responses or the source node is caching the block in a state other than shared, then the address of the block is not stored in partial directory cache 62.

On the other hand, if the Sh bit in the SrcDone packet is set (decision block 82, "yes" leg), then the address may be stored in the partial directory cache. If the address is not currently stored in partial directory cache 62 (decision block 84), coherency control circuit 64 may store the address in partial directory cache 62 (block 86).

It is noted that coherency control circuit 64 may retain information from the processing of the read command to determine whether or not the address is stored in partial directory cache 62 (decision block 84). Alternatively, the address may be presented to partial directory cache 62 in response to receiving the SrcDone packet to determine whether or not the address is stored in the partial directory cache 62. The SrcDone packet may include information allowing it to be associated with the corresponding command (e.g. source node number and source tag).

Figure 12:
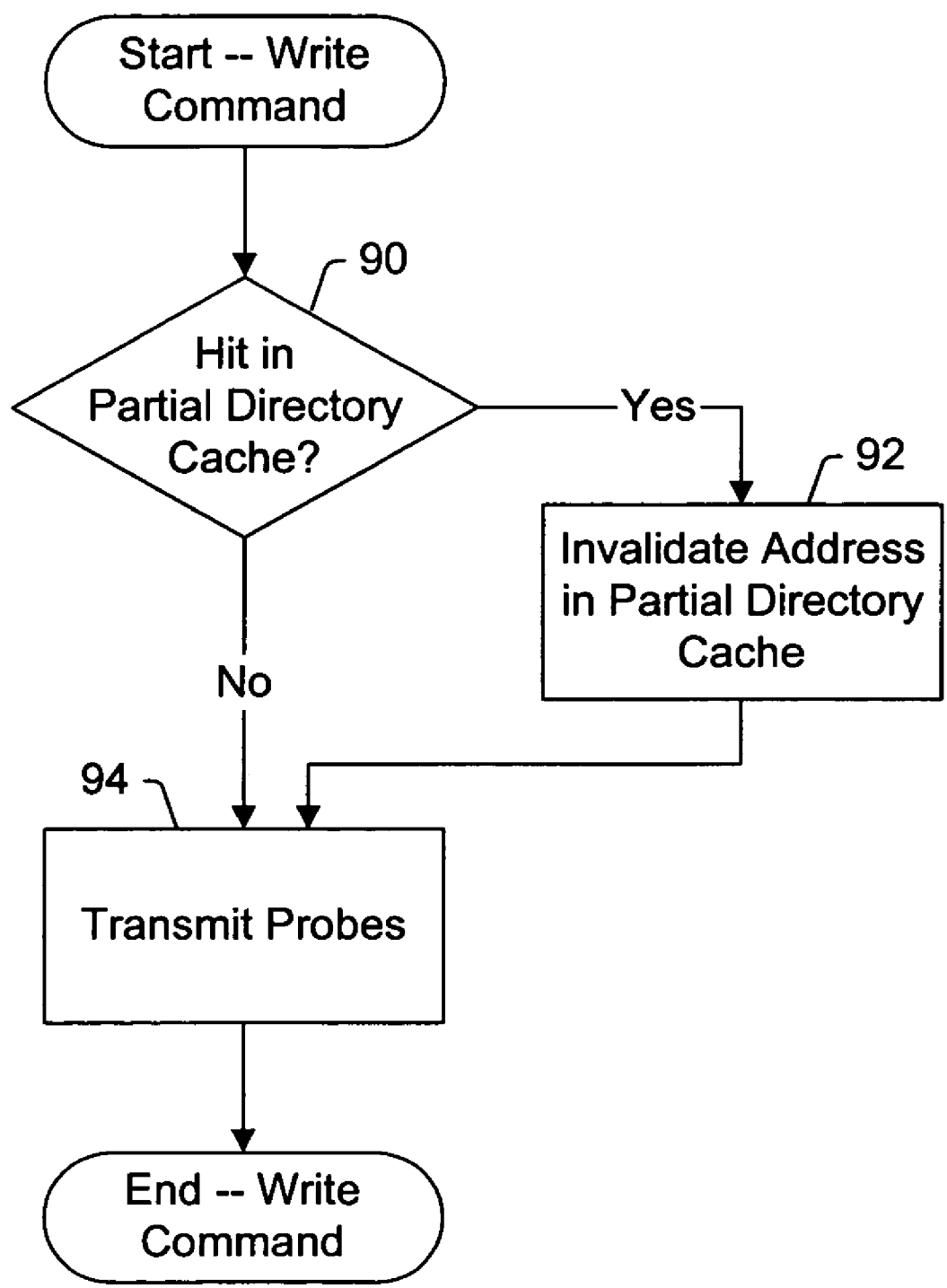
FIG. 12 is a flowchart illustrating operation of one embodiment of the coherency control circuit shown in FIG. 9 for write commands.

Turning now to FIG. 12, a flowchart is shown illustrating operation of one embodiment of coherency control circuit 64 in response to a write command. Other embodiments are possible and contemplated. The blocks shown in FIG. 12 are illustrated in a particular order for ease of understanding. However, any order may be used. Furthermore, blocks may be performed in parallel by combinatorial logic within the coherency control circuit 64. Still further, blocks may be performed at different times from other blocks (e.g. different clock cycles).

If the write address of the write command is a hit in partial directory cache 62 (decision block 90), coherency control circuit 64 invalidates the address in partial directory cache 62 (block 92). In either case, coherency control circuit 64 may cause probes to be transmitted in response to the write command (block 94). For example, coherency control circuit 64 may transmit the probe indication described above to packet processing logic 58.

It is noted that, while the flowchart of FIG. 12 refers to write commands, the flowchart may generally be applicable to any command which requires exclusive access to the block.

Figure 13:
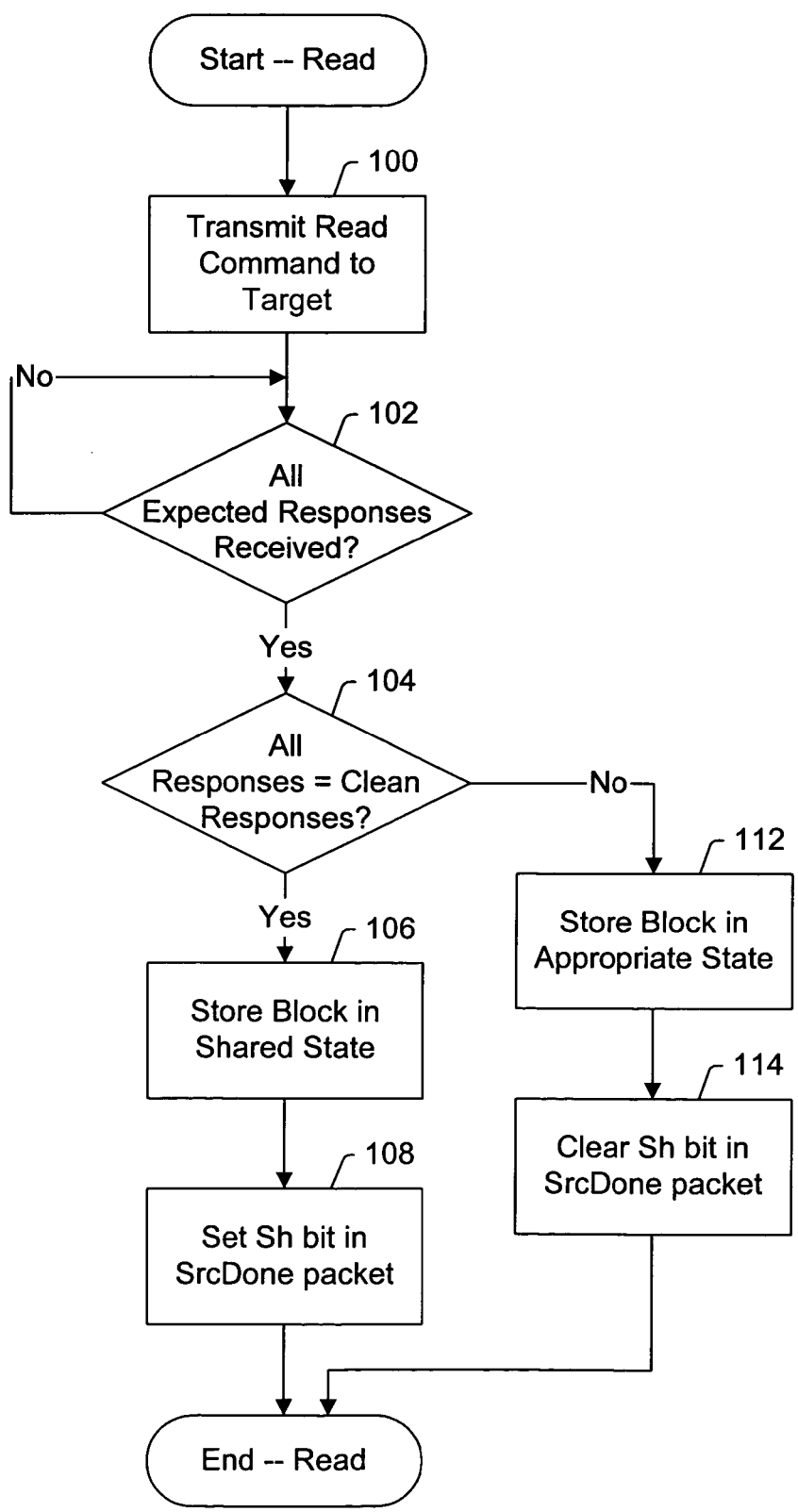
FIG. 13 is a flowchart illustrating operation of one embodiment of a source node of a read command.

Turning next to FIG. 13, a flowchart is shown illustrating operation of one embodiment of a source node in performing a read command. Other embodiments are possible and contemplated. The blocks shown in FIG. 13 are illustrated in a particular order for ease of understanding. However, any order may be used. Furthermore, blocks may be performed in parallel by combinatorial logic within the source node. Still further, blocks may be performed at different times from other blocks (e.g. different clock cycles).

The source node transmits the read command to the target node (block 100). The read command may be the result of detecting a cache miss within the source node, for example. The source node waits for the expected responses to the read command to be received (decision block 102). The expected responses may include at least one RdResponse packet (from the memory controller in the target node) and zero or more probe responses. Particularly, in one embodiment, the expected responses are one RdResponse packet from the memory controller if the NP bit in the RdResponse packet is set. If the NP bit is clear, then the expected responses further include a probe response from each other node in the system.

Once all the expected responses have been received, if all the probe responses are clean responses (decision block 104, "yes" leg), the source node stores the block in the shared state (block 106). Additionally, the source node sets the Sh bit in the SrcDone packet to indicate that the block is cached in a non-exclusive state (block 108), and transmits the SrcDone packet to the memory controller in the target node. It is noted that, in some embodiments, the source node may be configured to cache the block in an exclusive state if all the probe responses indicate invalid (and thus may not set the Sh bit in the source done packet). Such operation may be a programmable mode in the source node (either to cache the block in the shared state, allowing a partial directory cache entry to be allocated for the block, or to cache the block in an exclusive state, allowing for update of the block without communicating with the point of coherency). Alternatively, such operation may occur on a block-by-block basis, as desired.

On the other hand, if all the probe responses were not clean responses (decision block 104, "no" leg), the source node stores the block in a state consistent with the received responses (e.g. exclusive if all the responses indicate the block is invalid in the various responders, or shared if any other nodes are caching the block, if the MESI protocol is used) (block 112). Additionally, the source node clears the Sh bit in the SrcDone packet to indicate that the block is cached (in some node within the system) in a non-exclusive state (block 114), and transmits the SrcDone packet to the memory controller in the target node.

As an alternative to the source node automatically caching the block in the shared state (block 106) if all the probe responses were clean probe responses, the memory controller may transmit the RdResponse packet with the Sh bit set to cause the source node to cache the block in the shared state.

Turning now to FIG. 14, a block diagram of an exemplary entry 110 which may be employed by one embodiment of partial directory cache 62 is shown. Other embodiments are possible and contemplated. In the embodiment of FIG. 14, entry 110 includes a valid bit (V), a page address field (Page Address), and a plurality of block valid bits (B0V, B1V, B2V, B3V, through B63V).

Entry 110 may comprise multiple records, each of the records within the entry identifying blocks within the same page. Each block valid bit corresponds to a block within the page, with the B0V bit corresponding to the first block within the page (stored at the lowest block address within the page), the B1V bit corresponding to the second block within the page (stored at the second lowest block address within the page), etc. up through the B63V bit corresponding to the last block within the page (stored at the largest block address within the page). Each record is indicated as valid or invalid via a corresponding block valid bit, and the entry is indicated as valid via the valid bit. The page address field stores the page portion of the address of the blocks represented by entry 110. Accordingly, a record may comprise the page address field, the corresponding block valid bit, and the valid bit (where a record is a representation of one block address in partial directory cache 62). The storage for the page address field and the valid bit is shared for all the records within the page, and thus the amount of storage used may be less than if each record were accorded its own entry with an address field and a valid bit. An embodiment of partial directory cache 62 employing entries of the form of entry 110 may leverage the locality of cache reference that may exist in a program, whereby if one block in a page is cached, other blocks in the page may be cached as well. Programs which exhibit locality of cache reference may efficiently use the entries 110.

Coherency control unit 64 may allocate a record for a block by first comparing the page portion of the address of the block to the page address field of the entries in partial directory cache 62. If a match on the page portion of the address is detected in a valid entry (V bit set), then the block address within the page is decoded to select a block valid bit within that entry. The selected block valid bit is set. On the other hand, if a match on the page portion of the address is not detected in a valid entry, an entry is selected for the block according to a replacement algorithm. The page portion of the address is stored in the page address field and the valid bit (V is set). Additionally, the block valid bit corresponding to the block (as described above) is set.

Coherency control unit 64 may search for a record corresponding to a block accessed by a read command in a similar fashion: by comparing the page portion of the address of the block accessed by the read command to the page address field of the entries, and decoding the block address within the page to select a block valid bit. If a match is detected on a valid entry and the selected block valid bit is set, a record identifying the block accessed by the read command exists in partial directory cache 62. Otherwise, a record identifying the block accessed by the read command does not exist in partial directory cache 62.

The entry 110 illustrated in FIG. 14 may include 64 block valid bits (for a 4 kilobyte page size and a 64 byte block size). Other embodiments may include different numbers of block valid bits per entry dependent upon the page size and the block size (both of which may be varied according to design choice).

Other embodiments of entries are contemplated as well. For example, an embodiment in which each entry corresponds to one record (e.g. with a valid bit and block address including page portion). Generally, an "entry" in partial directory cache 62 is the unit of allocation of space in the partial directory cache. An entry may correspond to one or more records. A record is the information which identifies one block within the partial directory cache.

Turning next to FIG. 15, a block diagram is shown of one embodiment of a SrcDone packet 120 which may be used by a source node to indicate that a read command is done and to indicate whether or not all the probe responses corresponding to the read command were clean probe responses. Other embodiments are possible and contemplated. In the embodiment of FIG. 15, SrcDone packet 120 includes command, source unit, source node, destination unit, destination node, and source tag fields in bit times 1, 2, and 3 similar to FIGS. 3–5. Additionally, SrcDone packet 120 may include a shared bit (Sh—reference numeral 122). The shared bit may be used to indicate, when associated with a read command, whether or not the probe responses were clean probe responses. For example, the Sh bit may indicate that all the probe responses were clean probe responses when set and may indicate that at least one of the probe responses was not a clean probe response when clear. Alternatively, the Sh bit may indicate that all the probe responses were clean probe responses when clear and may indicate that at least one of the probe responses was not a clean probe response when set. Any indication may be used.

Turning now to FIG. 16, a block diagram is shown of one embodiment of a RdResponse packet 130 which may be used to indicate to the source node of a read command that no probe responses will occur for the read command. Other embodiments are possible and contemplated. In the embodiment of FIG. 16, RdResponse packet 130 includes command, source unit, source node, destination unit, destination node, and source tag fields in bit times 1, 2, and 3 similar to FIGS. 3–5. Additionally, RdResponse packet 130 includes an error bit (Err), a count field (Count[3:0]), a cancel bit (Cncl), a no probes bit (reference numeral 132), a probe bit (P) and a shared bit (Sh) (reference numeral 134). The error bit may be set to indicate an error has occurred. The count field is used for ReadSized commands to indicate the number of bytes provided, and may be set to 0xF for block read responses. The cancel bit may be used by a probed node to indicate that a MemCancel packet was sent to the memory controller for the read command. The probe bit may be set to indicate the RdResponse packet 130 is from a probed node, and may be cleared to indicate that the RdResponse packet 130 is from the memory controller.

No probes bit 132 may be used to indicate to the source node whether or not probe responses may occur for the read command (as described above). If NP bit 132 is set, no probe responses will occur. If NP bit 132 is clear, probe responses will be received and the source node may await the probe responses before committing the read command. Alternatively, the NP bit 132 may indicate, when clear, that no probe responses will occur and may indicate, when set, that probe responses will be received. Any indication may be used.

Shared (Sh) bit 134 may indicate whether or not the source node caches the block in the shared state. For example, the Sh bit 134 may indicate, when set, that the source node is to cache the block in the shared state and may indicate, when clear, that the source node is to cache the block in a state consistent with other probe responses. Alternatively, the Sh bit 134 may indicate, when clear, that the source node is to cache the block in the shared state and may indicate, when set, that the source node is to cache the block in a state consistent with other probe responses.

It is noted that, while the shared bits and the NP bit are illustrated at specific positions within the packets illustrated in FIGS. 15 and 16, any position may be used in other embodiments. Furthermore, as mentioned above, other embodiments may communicate with bus transactions rather than packets. In such and embodiment, the shared and no probes information could be communicated as part of the transaction, as side band signals, etc.

Numerous variations and modifications will become apparent to those skilled in the art once the above disclosure is fully appreciated. It is intended that the following claims be interpreted to embrace all such variations and modifications.

What is claimed is:

1. An apparatus comprising:
   a memory configured to store an indication of one or more addresses, wherein the memory is coupled to receive a first address of a read command; and
   a control circuit coupled to the memory, wherein the control circuit is configured to cause an issuance of one or more probes corresponding to the read command responsive to the first address missing in the memory, and wherein the control circuit is configured to inhibit the issuance of one or more probes corresponding to the read command responsive to the first address hitting in the memory;
   wherein, if the first address misses in the memory and the one or more probes result in clean probe responses, the control circuit is configured to store an indication of the first address in the memory.

2. The apparatus as recited in claim 1 wherein, in response to a second command for exclusive access to a block corresponding to the first address, the control circuit is configured to invalidate the indication of the first address in the memory.

3. The apparatus as recited in claim 2 wherein the control circuit is further configured to cause the issuance of one or more probes for the second command.

4. The apparatus as recited in claim 1 wherein the control circuit is coupled to receive an indication of a message from a source of the read command indicating whether or not the one or more probes resulted in clean probe responses.

5. The apparatus as recited in claim 1 wherein the control circuit is configured to cause a source of the read command to store a block addressed by the first address in a shared state if the first address hits in the memory.

6. The apparatus as recited in claim 5 wherein the control circuit is configured to cause an indication in a read response message transmitted to the source to indicate shared.

7. The apparatus as recited in claim 5 wherein the control circuit is configured to cause an indication in a read response message transmitted to the source to indicate that no probe responses will be received by the source.

8. A computer system comprising:
   a first node configured to transmit a read command having a first address; and
   a second node coupled to receive the read command, the second node coupled to a first memory storing a first block addressed by the first address, wherein the second node includes a second memory configured to store an indication of one or more addresses, and wherein the second node is configured to issue one or more probes corresponding to the read command responsive to the first address missing in the second memory, and wherein the second node is configured to inhibit the issuance of one or more probes corresponding to the read command responsive to the first address hitting in the second memory;

wherein, if the first address misses in the second memory and the one or more probes result in clean probe responses, the second node is configured to store an indication of the first address in the first memory.

9. The computer system as recited in claim 8 wherein, in response to a second command for exclusive access to the first block, the second node is configured to invalidate the indication of the first address in the second memory.

10. The computer system as recited in claim 9 wherein the second node is further configured to issue one or more probes for the second command.

11. The computer system as recited in claim 8 further comprising one or more nodes coupled to receive the one or more probes, wherein the one or more nodes are configured to transmit the probe responses to the first node, and wherein the first node is configured to transmit a message to the second node indicating whether or not the one or more probes resulted in clean probe responses.

12. The computer system as recited in claim 8 wherein the second node is configured to transmit the first block to the first node as a read response message, and wherein the second node is configured to indicate, in the read response message, that the first node is to store the first block in a shared state responsive to the first address hitting in the second memory.

13. The computer system as recited in claim 12 wherein the second node is further configured to indicate, in the read response message, that no probe responses will be received by the source responsive to the first address hitting in the second memory.

14. A method comprising:
receiving a first address of a read command;
searching a memory configured to store an indication of one or more addresses for the first address;
if the searching results in a miss, transmitting one or more probes corresponding to the read command and, if the one or more probes result in clean probe responses, storing an indication of the first address in the memory; and
if the searching results in a hit, not transmitting the one or more probes.

15. The method as recited in claim 14 further comprising:
receiving a second command for exclusive access to a block corresponding to the first address; and
invalidating the indication of the first address in the memory responsive to the receiving.

16. The method as recited in claim 14 further comprising:
transmitting a read response message with a block corresponding to the first address; and
indicating, in the read response message, that a source of the read command is to store the block in a shared state.

17. The method as recited in claim 16 further comprising indicating, in the read response message, that no probe responses will be received corresponding to the read command.

18. A computer system comprising:
a first processing node configured to transmit a read command having a first address; and
a second processing node, including a directory memory and a coherency control circuit, configured to receive the read command, wherein said directory memory is coupled to said coherency control circuit, wherein said directory memory is configured to store an indication of one or more addresses and configured to receive the first address of the read command, wherein the coherency control circuit is configured to selectively issue one or more probe commands corresponding to the read command depending on whether the directory memory includes an indication of the first address;
wherein, if the first address misses in the memory and the one or more probes result in clean probe responses, the coherency control circuit is configured to store an indication of the first address in the memory.

19. The computer system of claim 18, wherein the directory memory is a cache.

20. The computer system of claim 18, wherein the coherency control circuit is configured to cause a transmission of the one or more probe commands if the first address of the read command is a miss, wherein a miss indicates that the directory memory does not include the indication of the first address.

21. The computer system of claim 18, wherein the coherency control circuit, responsive to the first address of the read command being a hit, does not transmit of the one or more probe commands, wherein a hit indicates that the directory memory includes the indication of the first address.

22. The computer system as recited in claim 18 wherein, in response to a second command for exclusive access to a block corresponding to the first address, the coherency control circuit is configured to invalidate the indication of the first address in the memory.

23. The computer system as recited in claim 22 wherein the coherency control circuit is further configured to cause the issuance of one or more probes for the second command.

24. The computer system as recited in claim 18 wherein the coherency control circuit is coupled to receive an indication of a message from a source of the read command indicating whether or not the one or more probes resulted in clean probe responses.

25. The computer apparatus as recited in claim 18 wherein the coherency control circuit is configured to cause a source of the read command to store a block addressed by the first address in a shared state if the first address hits in the memory.

26. The computer apparatus as recited in claim 25 wherein the coherency control circuit is configured to cause an indication in a read response message transmitted to the source to indicate shared.

27. The computer system as recited in claim 25 wherein the coherency control circuit is configured to cause an indication in a read response message transmitted to the source to indicate that no probe responses will be received by the source.

* * * * *